(12) United States Patent
McLean

(10) Patent No.: US 7,380,713 B2
(45) Date of Patent: Jun. 3, 2008

(54) POSITIVE EVIDENCE-OF-USE FEATURE FOR PORTABLE STORAGE DEVICES

(75) Inventor: James G. McLean, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/954,639

(22) Filed: Dec. 12, 2007

(65) Prior Publication Data

US 2008/0090449 A1 Apr. 17, 2008

Related U.S. Application Data

(63) Continuation of application No. 11/550,073, filed on Oct. 17, 2006, now Pat. No. 7,334,731.

(51) Int. Cl.
*G06K 7/06* (2006.01)
(52) U.S. Cl. .................. 235/443; 235/441; 235/442; 439/136; 439/140; 439/141
(58) Field of Classification Search ................ 235/382, 235/439, 442, 443, 487; 439/131, 133, 135, 439/137, 140, 141; 361/726, 732
See application file for complete search history.

(56) References Cited

U.S. PATENT DOCUMENTS

| | | | |
|---|---|---|---|
| 5,058,775 A | 10/1991 | Gross et al. | |
| 5,217,307 A | 6/1993 | McClintock | |
| 5,225,816 A | 7/1993 | Lebby et al. | |
| 5,524,616 A | 6/1996 | Smith et al. | |
| 5,946,520 A | 8/1999 | Hooper et al. | |
| 6,490,163 B1 | 12/2002 | Pua et al. | |
| 6,574,586 B1 | 6/2003 | David et al. | |
| 6,595,792 B1 | 7/2003 | Rudolph et al. | |
| 6,612,853 B2 | 9/2003 | Wu | |
| 6,676,419 B1 | 1/2004 | Lin et al. | |
| 6,808,400 B2 | 10/2004 | Tu | |
| 6,932,629 B2 | 8/2005 | Ikenoue | |
| 6,979,210 B2 | 12/2005 | Regen et al. | |
| 7,037,120 B1 | 5/2006 | Yeh | |
| 7,090,515 B2 | 8/2006 | Regen et al. | |
| 7,092,256 B1 | 8/2006 | Salazar et al. | |
| 7,104,814 B1 | 9/2006 | She et al. | |
| 7,153,148 B2 | 12/2006 | Chen et al. | |
| 7,179,099 B2 | 2/2007 | Hsieh | |
| 2004/0175984 A1 | 9/2004 | Zhou | |
| 2004/0212966 A1 | 10/2004 | Fisher et al. | |
| 2005/0106930 A1 | 5/2005 | Wu et al. | |
| 2006/0036872 A1 | 2/2006 | Yen | |

FOREIGN PATENT DOCUMENTS

JP 3125550 A 5/1991

*Primary Examiner*—Michael G. Lee
*Assistant Examiner*—Ali Sharifzada
(74) *Attorney, Agent, or Firm*—Cynthia S. Byrd; Hoffman, Warnick & D'Alessandro LLC

(57) ABSTRACT

The invention is directed to a positive evidence-of-use feature for portable storage devices. A system in accordance with an embodiment includes: a movable outer sleeve for surrounding a portion of the portable storage device, wherein the movable outer sleeve is configured for movement in one direction only; and a ratcheting system for retracting and permanently locking the movable outer sleeve into a housing of the portable storage device to expose a contact area of the portable storage device, the ratcheting system limiting the movable outer sleeve to a single retraction into the housing of the portable storage device, such that the ratcheting system is configured to be broken upon any attempt to extend the movable outer sleeve after the movable outer sleeve has been retracted and permanently locked into the housing of the portable storage device. Retraction of the movable outer sleeve provides positive evidence-of-use for the portable storage device.

10 Claims, 2 Drawing Sheets

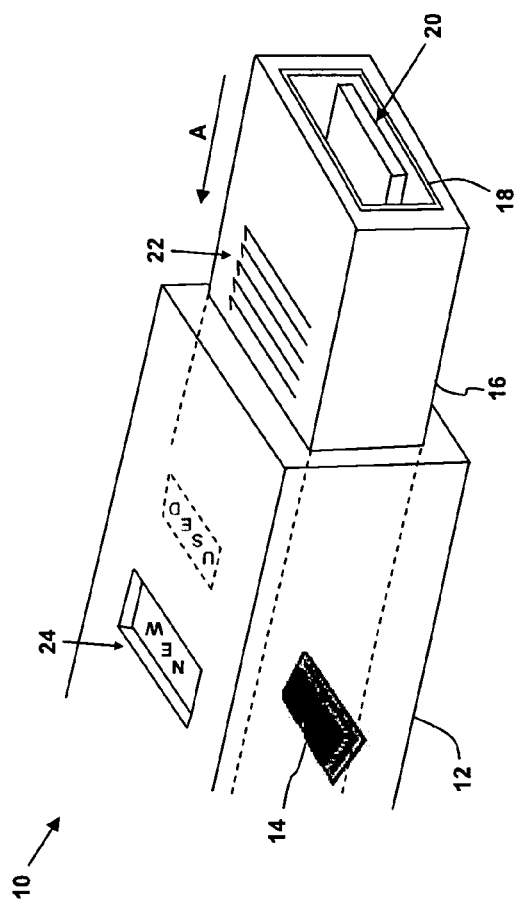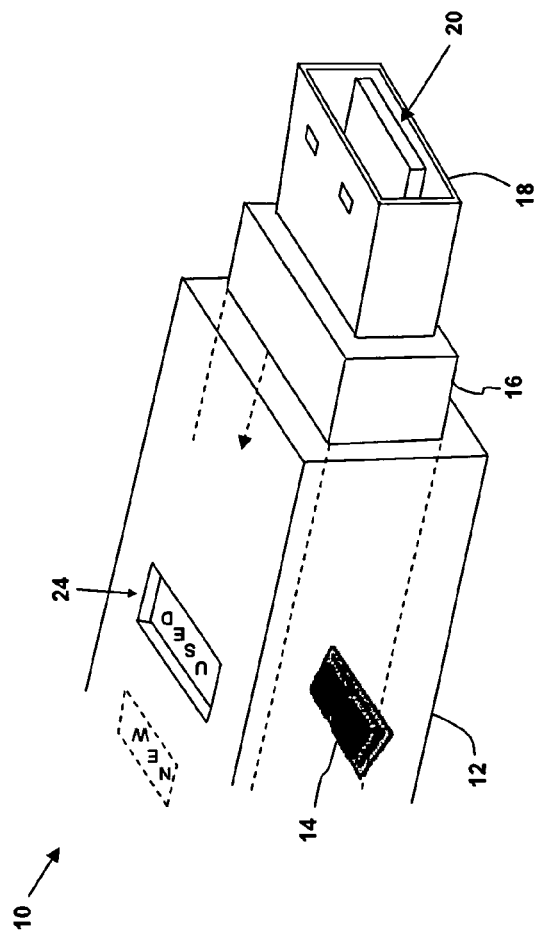

POSITIVE EVIDENCE-OF-USE FEATURE FOR PORTABLE STORAGE DEVICES

REFERENCE TO PRIOR APPLICATIONS

This application is a continuation application of U.S. patent application Ser. No. 11/550,073, filed on Oct. 17, 2006, now U.S. Pat. No. 7,334,731 which is hereby incorporated by reference.

BACKGROUND OF THE INVENTION

1. Field of the Invention

The present invention generally relates to storage devices. More specifically, the present invention is directed to a positive evidence-of-use feature for portable storage devices.

2. Related Art

Solid state storage devices, such as a Universal Serial Bus (USB) memory key, USB thumb drive, or Portable External Memory/Storage Package (PEMP), are increasingly supplanting discs (e.g., compact discs, digital versatile discs, etc.) as a method for distributing software. In some cases, it may be desirable to be able to distinguish between a storage device that has been used (e.g., inserted into a reading or controlling device) from one that has not been used. This could be useful, for example, if the storage device contains pre-dated software or serialized, single-use licensed software. A problem exists in that there is no way to determine whether a particular storage device has been used. Accordingly, there is a need for a mechanism that will allow visual and irreversible evidence that a particular storage device has been used.

SUMMARY OF THE INVENTION

The present invention is directed to a positive evidence-of-use feature for portable storage devices. In particular, in one embodiment, a movable outer sleeve formed of plastic, nylon, or other suitable non-conductive material is provided around the outer perimeter of the ground shell of the storage device. This sleeve is movable in one direction only, within the main housing of the device, using a ratcheting mechanism or the like. In order to insert the storage device into a port or other interface, the sleeve must be retracted into the main housing of the storage device. The retracted position of the sleeve provides positive evidence of the use of the storage device. The sleeve, when retracted, is locked within the main housing of the device.

A first aspect of the present invention is directed to a system for providing positive evidence-of-use for a portable storage device, comprising: a movable outer sleeve for surrounding a portion of the portable storage device, wherein the movable outer sleeve is configured for movement in one direction only; and a ratcheting system for retracting and permanently locking the movable outer sleeve into a housing of the portable storage device to expose a contact area of the portable storage device, the ratcheting system limiting the movable outer sleeve to a single retraction into the housing of the portable storage device, such that the ratcheting system is configured to be broken upon any attempt to extend the movable outer sleeve after the movable outer sleeve has been retracted and permanently locked into the housing of the portable storage device; wherein retraction of the movable outer sleeve into the housing of the portable storage device provides positive evidence-of-use for the portable storage device.

A second aspect of the present invention is directed to a portable storage device, comprising: a housing; non-volatile memory for storing data; a contact area; and a system for providing positive evidence-of-use, comprising: a movable outer sleeve for surrounding a portion of the portable storage device, wherein the movable outer sleeve is configured for movement in one direction only; and a ratcheting system for retracting and permanently locking the movable outer sleeve into a housing of the portable storage device to expose a contact area of the portable storage device, the ratcheting system limiting the movable outer sleeve to a single retraction into the housing of the portable storage device, such that the ratcheting system is configured to be broken upon any attempt to extend the movable outer sleeve after the movable outer sleeve has been retracted and permanently locked into the housing of the portable storage device; wherein retraction of the movable outer sleeve into the housing of the portable storage device provides positive evidence-of-use for the portable storage device The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings in which:

FIG. 1 depicts a partial view of an illustrative storage device in accordance with an embodiment of the present invention, prior to use.

FIG. 2 depicts the illustrative storage device of FIG. 1, after use, in accordance with the present invention.

Figure 3:
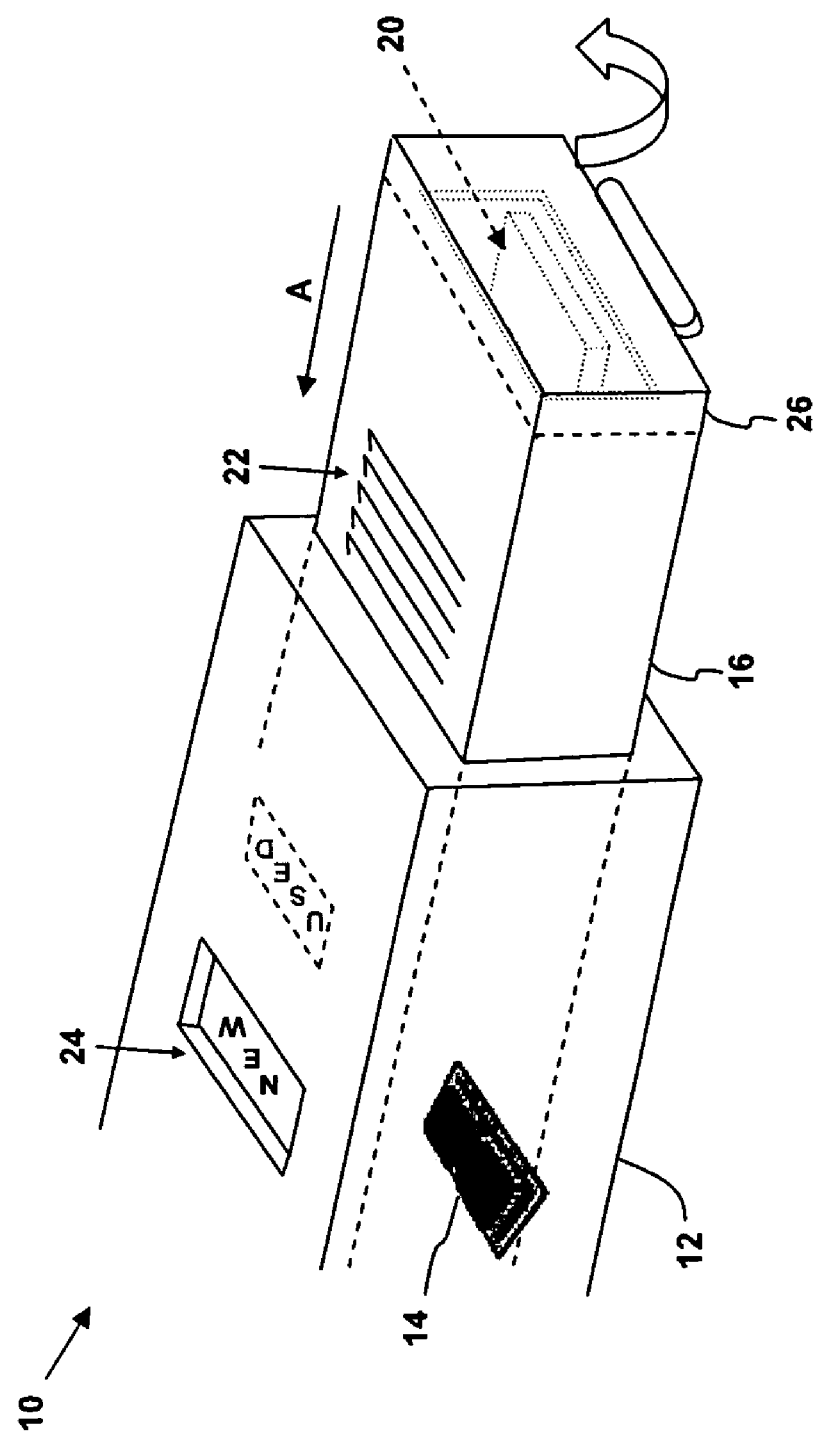
FIG. 3 depicts a partial view of an illustrative storage device in accordance with another embodiment of the present invention, prior to use.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As described above, the present invention is directed to a positive evidence-of-use feature for portable storage devices. In particular, in one embodiment, a movable outer sleeve formed of plastic, nylon, or other suitable non-conductive material is provided around the outer perimeter of the ground shell of the storage device. This sleeve is movable in one direction only, within the main housing of the device, using a ratcheting mechanism or the like. In order to insert the storage device into a port or other interface, the sleeve must be retracted into the main housing of the storage device. The retracted position of the sleeve provides positive evidence of the use of the storage device. The sleeve, when retracted, is locked within the main housing of the device.

A partial view of an illustrative storage device 10 in accordance with the present invention, prior to use, is depicted in FIG. 1. The storage device 10 includes a main housing 12, which contains non-volatile memory 14 for storing data. One example of a commonly used non-volatile memory is flash memory.

The storage device 10 further includes a movable outer sleeve 16 formed of plastic, nylon, or other suitable non-conductive material, which is provided around the outer perimeter of a ground shell 18 surrounding the contact area 20 of the storage device 10. The movable outer sleeve 16 is configured for movement in one direction only, into and within the main housing 12 of the storage device 10, as indicated by directional arrow A. The limited movement of the movable outer sleeve 16 can be provided using a ratcheting-type mechanism 22 as shown in FIG. 1, or in any other suitable manner.

When the movable outer sleeve 16 is in its initial position as depicted in FIG. 1, the contact area 20 of the storage device 10 is covered. Prior to insertion into a corresponding port or the like, a user can manually retract the movable outer sleeve 16 into the main housing of the storage device 10 to expose the contact area 20. Alternatively, the movable outer sleeve 16 can be retracted as the storage device is inserted. After retraction, the storage device 10 appears as shown in FIG. 2, with the contact area 20 of the storage device 10 exposed for use. Thus, in order to insert the storage device 10 into a port or other interface, the movable outer sleeve 16 must be retracted into the main housing 12 of the storage device 10. The retraction of the movable outer sleeve 16 into the main housing 12 of the portable storage device 10 provides positive evidence-of-use for the portable storage device 10.

The ratcheting-type mechanism 22 locks the movable outer sleeve 16 within the main housing 12 of the portable storage device 10 and prevents the movable outer sleeve 16 from being returned to its initial position. If the movable outer sleeve 16 is forced back to its initial position, the ratcheting-type mechanism 22 will be broken, providing positive evidence of tampering.

A window indicator 24 can be used to display words, colors, icons, or other indicia indicating the state of the storage device 10. For instance, as shown in FIG. 1, the window indicator 24 displays the word "NEW," indicating that the storage device 10 has not been used. In FIG. 2, however, the window indicator 24 displays the word "USED," indicating that the storage device 10 has been used. The words "NEW" and "USED" can be printed or otherwise provided on the top of the movable outer sleeve 16.

FIG. 3 depicts a partial view of an illustrative storage device in accordance with another embodiment of the present invention, prior to use. In this embodiment, the movable outer sleeve 16 completely covers the contact area 20 of the storage device 10 and includes a frangible tab 26 that blocks access to the contact area 20. Prior to use, a user must physically and permanently remove the frangible tab 26 to allow the movable outer sleeve 16 to be retracted. After removal, the frangible tab 26 could be used as a proof-of-purchase or rebate token.

In accordance with yet another embodiment of the present invention, the movable outer sleeve 16 is reversible (i.e., can be re-extended) using a special key, reverse gear activated by a unique tool, or other limited-access mechanism. Such an approach would allow authorized re-use of storage devices as in a movie rental scenario, allowing the renter to determine which rented storage device(s) have actually been used.

The foregoing description of the embodiments of this invention has been presented for purposes of illustration and description. It is not intended to be exhaustive or to limit the invention to the precise form disclosed, and many modifications and variations are possible.

What is claimed is:

1. A system for providing positive evidence-of-use for a portable storage device, comprising:
   a movable outer sleeve for surrounding a portion of the portable storage device, wherein the movable outer sleeve is configured for movement in one direction only; and
   a ratcheting system for retracting and permanently locking the movable outer sleeve into a housing of the portable storage device to expose a contact area of the portable storage device, the ratcheting system limiting the movable outer sleeve to a single retraction into the housing of the portable storage device, such that the ratcheting system is configured to be broken upon any attempt to extend the movable outer sleeve after the movable outer sleeve has been retracted and permanently locked into the housing of the portable storage device;
   wherein retraction of the movable outer sleeve into the housing of the portable storage device provides positive evidence-of-use for the portable storage device.

2. The system of claim 1, further comprising:
   a system for indicating a state of the portable storage device, wherein the system for indicating comprises indicia provided on the movable outer sleeve and a window formed in the housing of the portable storage device, wherein the indicia is displayed in the window.

3. The system of claim 1, wherein the portable storage device further comprises non-volatile memory for storing data.

4. The system of claim 1, wherein the movable outer sleeve is formed of a non-conductive material.

5. The system of claim 4, wherein the movable outer sleeve is provided around an outer perimeter of a ground shell surrounding the contact area of the portable storage device.

6. The system of claim 1, wherein the movable outer sleeve completely covers the contact area of the portable storage device prior to use, the system further comprising:
   a system for blocking access to the contact area of the portable storage device using a removable portion of the movable outer sleeve;
   a system for preventing retraction of the movable outer sleeve into the housing of the portable storage device using the removable portion of the movable outer sleeve; and
   a system for allowing retraction of the movable outer sleeve into the housing of the portable storage device only upon permanent removal of the portion of the movable outer sleeve.

7. The system of claim 6, wherein the portion of the movable outer sleeve further comprises a frangible tab.

8. The system of claim 7, wherein the frangible tab comprises a proof-of-purchase or rebate token.

9. A portable storage device, comprising:
   a housing;
   non-volatile memory for storing data;
   a contact area; and
   a system for providing positive evidence-of-use, comprising:
      a movable outer sleeve for surrounding a portion of the portable storage device, wherein the movable outer sleeve is configured for movement in one direction only; and
      a ratcheting system for retracting and permanently locking the movable outer sleeve into a housing of the portable storage device to expose a contact area of the portable storage device, the ratcheting system limiting the movable outer sleeve to a single retraction into the housing of the portable storage device, such that the ratcheting system is configured to be broken upon any attempt to extend the movable outer sleeve after the movable outer sleeve has been retracted and permanently locked into the housing of the portable storage device;

wherein retraction of the movable outer sleeve into the housing of the portable storage device provides positive evidence-of-use for the portable storage device.

10. The portable storage device of claim 9, further comprising:

a system for indicating a state of the portable storage device using indicia provided on the movable outer sleeve and a window formed in the housing of the portable storage device, wherein the indicia is displayed in the window.

* * * * *